United States Patent
Bruckner

(10) Patent No.: US 9,062,712 B1
(45) Date of Patent: Jun. 23, 2015

(54) PASSIVE THERMAL MANAGEMENT OF FOIL BEARINGS

(71) Applicant: The United States of America as represented by the Administrator of the National Aeronautics and Space Administration, Washington, DC (US)

(72) Inventor: Robert J. Bruckner, Cleveland, OH (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 48 days.

(21) Appl. No.: 13/771,833

(22) Filed: Feb. 20, 2013

Related U.S. Application Data

(60) Provisional application No. 61/603,550, filed on Feb. 27, 2012.

(51) Int. Cl.
*F16C 32/06* (2006.01)
*F16C 37/00* (2006.01)
*F16C 17/02* (2006.01)

(52) U.S. Cl.
CPC ............. *F16C 37/002* (2013.01); *F16C 17/024* (2013.01)

(58) Field of Classification Search
CPC .............................. F16C 17/024; F16C 17/042
USPC .................................................. 384/103–106
See application file for complete search history.

(56) References Cited

U.S. PATENT DOCUMENTS

| | | | |
|---|---|---|---|
| 3,615,121 A | | 10/1971 | Barnett et al. |
| 3,957,317 A | | 5/1976 | Silver |
| 4,133,585 A | | 1/1979 | Licht |
| 4,178,046 A | | 12/1979 | Silver et al. |
| 4,348,066 A | | 9/1982 | Agrawal et al. |
| 4,621,930 A | * | 11/1986 | Gu et al. ................ 384/105 |
| 4,654,939 A | | 4/1987 | Silver |
| 4,818,123 A | * | 4/1989 | Gu ........................ 384/106 |
| 5,318,366 A | | 6/1994 | Nadjafi |
| 5,427,455 A | | 6/1995 | Bosley |
| 5,529,398 A | | 6/1996 | Bosley |
| 5,871,284 A | | 2/1999 | Nadjafi et al. |
| RE38,373 E | | 12/2003 | Bosley |
| 6,702,463 B1 | | 3/2004 | Brockett et al. |
| 7,261,300 B2 | | 8/2007 | Agrawal et al. |
| 2004/0096130 A1 | | 5/2004 | Saville et al. |
| 2011/0120776 A1 | | 5/2011 | Cooley et al. |
| 2011/0150376 A1 | | 6/2011 | Lee |

OTHER PUBLICATIONS

Deans, Matthew C., Schneider, Steven J.; "Development and Testing of a methane/Oxygen Catallytic Microtube Ignition System for Rocket Propulsion", American Institute of Aeronautics and Astronautics.

* cited by examiner

*Primary Examiner* — Phillip A Johnson
(74) *Attorney, Agent, or Firm* — Robert H. Earp, III

(57) ABSTRACT

Systems and methods for passive thermal management of foil bearing systems are disclosed herein. The flow of the hydrodynamic film across the surface of bearing compliant foils may be disrupted to provide passive cooling and to improve the performance and reliability of the foil bearing system.

19 Claims, 9 Drawing Sheets

PASSIVE THERMAL MANAGEMENT OF FOIL BEARINGS

CROSS-REFERENCE TO RELATED APPLICATIONS

This application claims the benefit of U.S. Provisional Patent application Ser. No. 61/603,550 entitled Method to Increase Performance of Foil Bearing Through Passive Thermal Management and filed Feb. 27, 2012. The entirety of the above-noted application is incorporated by reference herein.

ORIGIN OF THE INVENTION

The invention described herein was made by employees of the United States Government and may be manufactured and used by or for the Government for Government purposes without the payment of any royalties thereon or therefore.

FIELD OF THE INVENTION

This application relates generally to foil bearings and related technology, and more specifically to systems and methods for enhancing the performance of foil bearings through passive cooling.

BACKGROUND

Bearings are used between the rotating and stationary parts of various types of machinery. High speed rotating machinery, such as motors, turbines, pumps, and compressors employ anti-friction elements to separate rotating and stationary components. Many traditional antifriction devices, such as ball and roller bearings, impose limitations on the size and speed of the rotating machinery. These bearings must be actively cooled and require oil lubrication sub-systems that provide a thin film of oil between the moving parts of the bearing. Oil lubrication sub-systems impose a burden on the primary machine and add a level of unreliability and inefficiency. Without oil, the metal-to-metal contact would cause the machine to grind to a halt. Use of oil-free bearings removes the need for the oil system thus reducing weight, maintenance, and complexity of the engine.

Oil-free operation is attained through the use of foil bearings. Foil bearings are unique anti-friction devices that utilize the working fluid of a machine as a lubricant, typically air for turbines and motors, and liquids for pumps, also act as a coolant to remove excess energy due to frictional heating in the bearings. Conventional foil bearings have been used for a number of years in high speed rotating machinery, air cycle machines for aircraft cabin pressurization, and other small turbomachinery. Foil bearings present an attractive alternative to ball or roller bearings for lightweight machines because they offer numerous system level benefits such as overall simplicity, reduction in weight, reduced friction, enhanced reliability, and zero oil contamination.

However, a primary technical challenge in the application of foil bearing technology to high speed rotating machinery is the dual use of the system process fluid as the hydrodynamic lubricant. Traditional foil bearings utilize forced cooling of the bearing and shaft, which results in reduced efficiency and reliability. Forced cooling is necessary because the heat capacity of the working fluid is low in comparison to the frictional heating of the bearing. There are several deleterious side effects caused by forced cooling. Firstly, the performance of the rotating machine is compromised because the forced cooling gas is taken from the main product of the machine. Secondly, the high flow rates needed to cool a foil bearing often lead to substandard hydrodynamic conditions of the foil bearing. Finally, forced cooling often masks the true stress of an operating foil bearing, which can cause bearing failure to be chaotic and unpredictable.

Specific limitations of conventional foil bearings include low load capacity, low damping, substantial friction, load capacity drop-off at high speed, and unpredictable failures.

SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

In an embodiment, a foil bearing system comprises a compliant foil bearing mounted to a stationary member and operably disposed between the stationary member and a rotating member, wherein the compliant foil bearing supports the rotating member via a fluid film when the rotating member rotates, a plurality of compliant foils mounted on the compliant foil bearing, the plurality of compliant foils provide passive thermal management of the fluid film.

In other embodiments, a method of passive cooling of a foil bearing system, comprises providing a compliant foil bearing mounted to a stationary member and operably disposed between the stationary member and a rotating member, providing a plurality of compliant foils, wherein the compliant foil bearing supports the rotating member via a fluid film when the rotating member rotates, and disrupting a flow of the fluid film across the plurality of compliant foils.

To accomplish the foregoing and related ends, certain illustrative aspects of the disclosure are described herein in connection with the following description and the annexed drawings. These aspects are indicative, however, of but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

DETAILED DESCRIPTION

Figure 1:
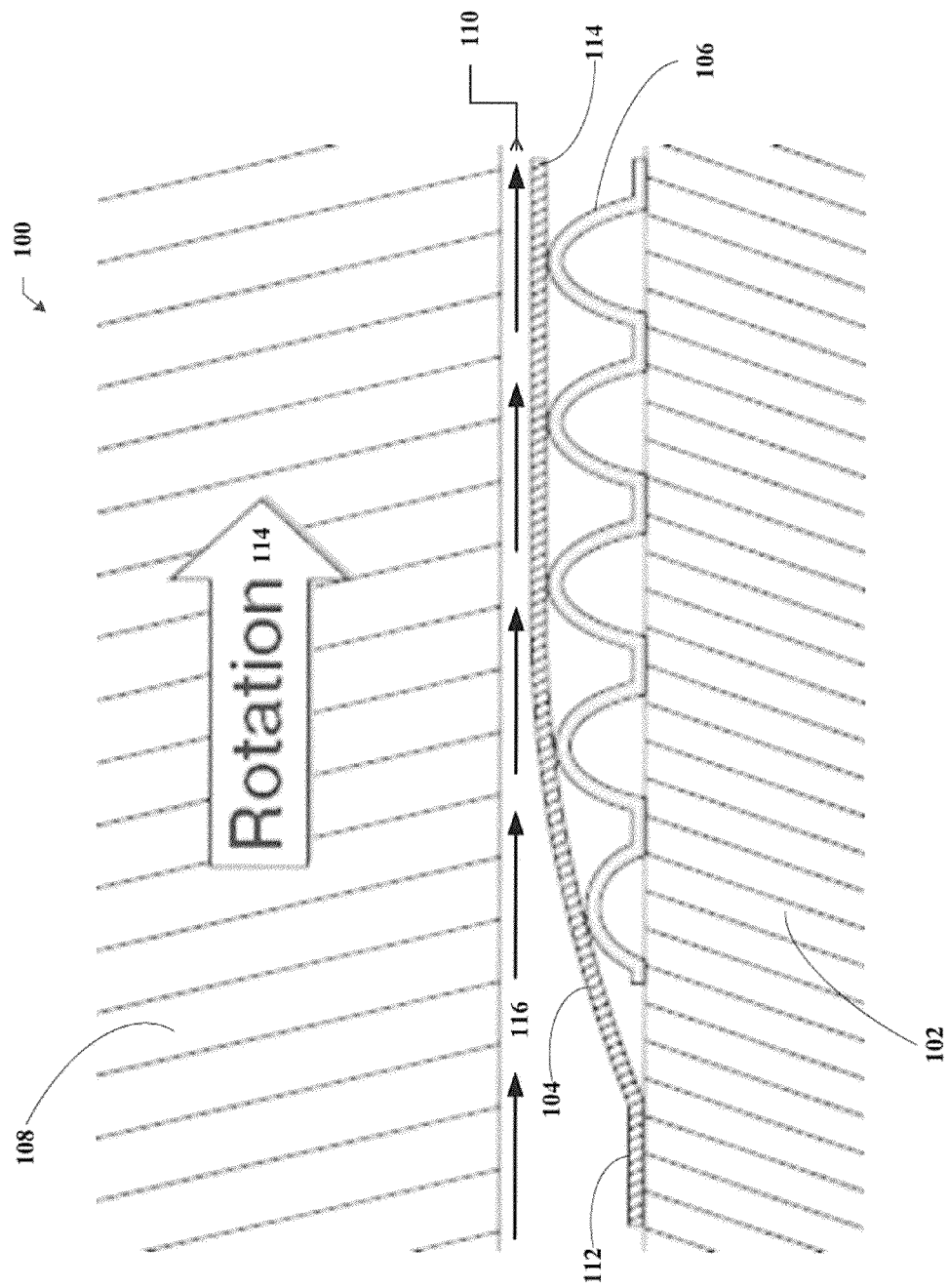
FIG. 1 illustrates the operation of a foil bearing.

The following terms are used throughout the description, the definitions of which are provided herein to assist in understanding various aspects of the subject disclosure.

As used herein, the term "compliant foil" refers to a top foil of a foil bearing. A compliant foil may also be referred to as a top foil or a sector of the foil bearing.

As used herein, the term "fluid" refers to the process fluid of a foil bearing. The fluid may also be referred to as a lubricant or a liquid. In an embodiment, the process fluid may comprise air, gases other than air, oil, liquids other than oil, or most any other fluid.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosure can be practiced without these specific details.

While specific characteristics are described herein (e.g., orientations, configurations, thickness), it is to be understood that the features, functions and benefits of the disclosure can employ characteristics that vary from those described herein. These alternatives are to be included within the scope of the disclosure and claims appended hereto.

While, for purposes of simplicity of explanation, the one or more methodologies described herein, are described as a series of acts, it is to be understood and appreciated that the subject disclosure is not limited by the order of acts, as some acts may, in accordance with the disclosure, occur in a different order and/or concurrently with other acts from that described herein. For example, those skilled in the art will understand and appreciate that a methodology could alternatively be represented as a series of interrelated states or events, such as in a state diagram. Moreover, not all acts may be required to implement a methodology in accordance with the disclosure.

With reference now to the figures, as illustrated in FIG. 1, foil bearing 100 includes housing 102, compliant foil 104, bump foil 106 and shaft 108. The housing 102 anchors the bearing 100 to a non-rotating portion of a machine (not shown). Compliant foil 104 provides a stationary hydrodynamic surface and acts as a compliant surface that traps and supports the hydrodynamic (fluid) film 110 against the rotating shaft 108. Compliant foil 104 comprises a leading edge 112 fixedly engaged with the housing 102 and a trailing edge 114. Compliant foil 104 rests on the bump foil 106. Bump foil 106 may comprise, for example, a corrugated foil layer which serves as an elastic spring foundation providing the bearing elasticity. The shaft 108, or runner, provides a rotating hydrodynamic surface and may include a surface treatment to enhance hydrodynamic action and reduce friction.

As shaft 108 rotates in direction 114, fluid 116 is drawn into the space between the compliant foil 104 and the moving shaft 108, as shown in FIG. 1. In an embodiment, fluid 116 may be drawn into the hydrodynamic film 110 via a viscous dragging mechanism.

Fluid 116 may be a process fluid. In an embodiment, at high speeds the hydrodynamic film 110 may be less than about 0.001 in. thick and may support hundreds of pounds. The hydrodynamic film 110, comprised of fluid 116, between the moving shaft 108 surface and the stationary top foil 104 surface creates pressure that generates a load-carrying capacity. The foil bearing 100 may provide a stiff, shock-tolerant support for rotating machinery. The trapped fluid 116, i.e hydrodynamic film 110, and its cushioning effect behave similar to air in an automotive shock absorber.

Foil air bearings are hydrodynamic bearings that may use ambient air as the fluid 116, instead of oil. Both air and oil are fluids that may perform the job of separating moving metal parts. High rotational speeds, for example, greater than 10,000 rpm (revolutions per minute), allow the replacement of oil with air. Foil air bearings maintain the air film 110 between moving parts by pumping air 116 between the rotating shaft 108 and the stationary compliant foil surface 104. Foil bearing 100 may comprise a plurality of compliant foils, or sectors, 104.

During operation of the foil bearing 100, fluid 116 is driven by shear force through the gap between rotating 108 and stationary components 104 and into the hydrodynamic film 110. The primary outcome of this fluidic action is the generation of hydrodynamic pressure, which separates the two parts 108, 104 in relative motion. A secondary effect of this shear force is the frictional heating of the fluid 116. Traditional foil bearings utilize active cooling to remove excess heat. Forced cooling is accomplished, for example, through the bump foil 106 and housing 102. However, conventional forced cooling is inefficient and a significant portion of the heat from one sector of the bearing 100, for example compliant foil 104, is transferred to the next sector or compliant foil. Left unchecked, this mechanism can lead to catastrophic failure of the foil bearing 100.

In accordance with embodiments of the disclosure, the carryover of fluid 116 and heat from one sector of a foil bearing to the next, and the resulting deleterious effects, may be prevented by passive thermal management. Passive cooling may be accomplished by disrupting the flow of fluid 116 and exploiting fluidic mixing techniques to break apart the hydrodynamic film 110.

In an embodiment, a foil bearing passive cooling system and method may prevent the carryover of lubricant (e.g. fluid) from the exit of one sector to the inlet of the ensuing sector of the foil bearing. Passive thermal management may increase the load bearing capacity and enhance the reliability of the foil bearing. Operation of passively cooled bearings may be exploited in machine design to improve safety and overall performance and to lessen costly machine downtime. Passive thermal management of foil bearings may result in lower frictional torque when operating at lower (e.g. non-load capacity) loads, thus providing another improvement above conventional foil bearings.

In an embodiment, bearing geometry may be utilized to both increase load carrying capacity and to provide an inherent and passive cooling mechanism. An illustrative cooling mechanism may function to prevent used (i.e. higher temperature) lubricant from being carried over from the trailing edge of one sector, or compliant foil, into the leading edge of the next sector of the foil bearing. The elimination of lubrication carryover and the mixing of used lubricant with surrounding ambient fluid may be accomplished in several ways as discussed in detail below.

The subject foil bearing passive cooling systems and methods may prevent problems related to thermal instability due to frictional heat generation, and rotordynamic instability at high rotational speeds. In an embodiment, gas dynamic mixing and convection patterns are established to enhance load support and improve the efficiency, reliability, robustness and safety of a foil bearing.

Figure 2A:
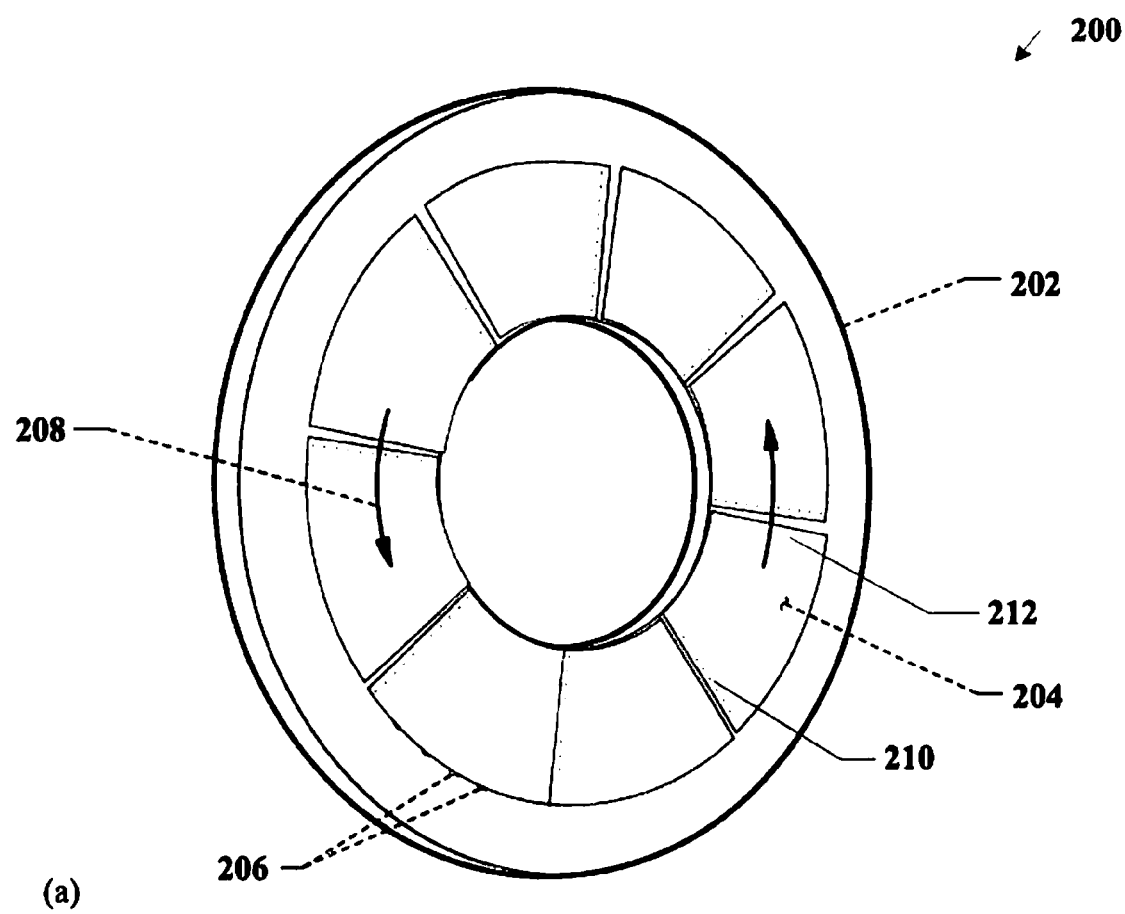
FIGS. 2A-2B are illustrations of example journal type and thrust type foil bearings.

Turning to FIG. 2A, a conventional thrust foil bearing 200 may support axial loads and includes housing 202, top foil 204 and bump foil 206 (partially shown). Arrow 208 indicates the direction of rotation of the moving shaft (not shown). The housing 202 anchors the thrust bearing 200 to a non-rotating portion of a machine. Top foil 204 provides a stationary hydrodynamic surface and acts as a compliant surface that traps and supports a hydrodynamic film against the rotating shaft (not shown). Top foil 204 comprises a leading edge 210 anchored, or otherwise fixedly engaged, with the housing 202, and a trailing edge 212. Top foil 204 rests on the bump foil 206. Bump foil 206 may comprise, for example, a corrugated foil layer. The shaft (not shown) provides a rotating hydrodynamic surface.

Figure 2B:
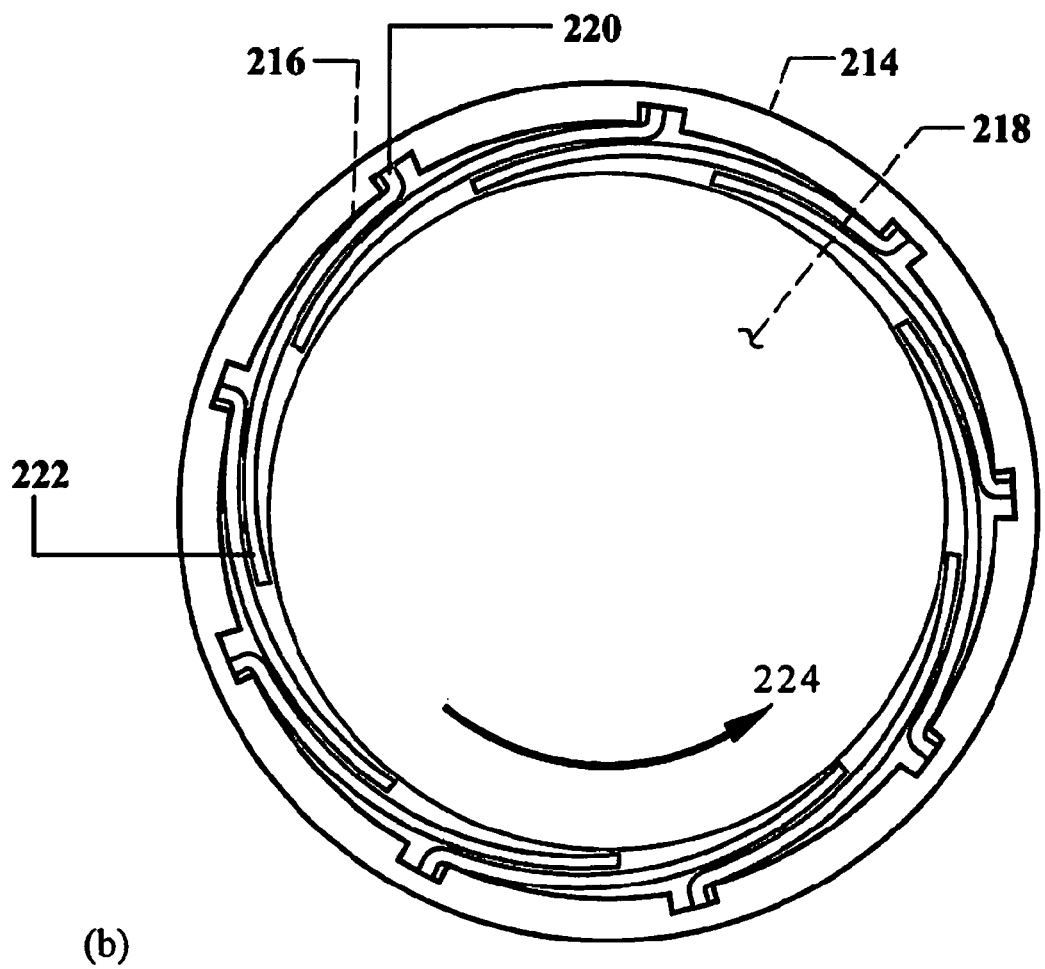

As shown in FIG. 2B, a conventional journal foil bearing may support radial loads and includes housing, or bearing sleeve, 214, top foil 216, a bump foil (not shown) and journal, 218. Top foil 216 rests on the underlying bump foil (not shown). The bump foil which may comprise a corrugated foil layer positioned between the top foil 216 and housing 214. Top foil 216 and the bump foil are anchored to housing 214. Top foil 216 provides a stationary hydrodynamic surface and acts as a compliant surface that traps and supports a hydrodynamic film against journal 218. Top foil 216 comprises a leading edge 220 fixedly engaged with the housing 214, and a trailing edge 222. Journal 218 provides a rotating hydrodynamic surface whose direction of rotation is indicated by arrow 224.

Figure 3:
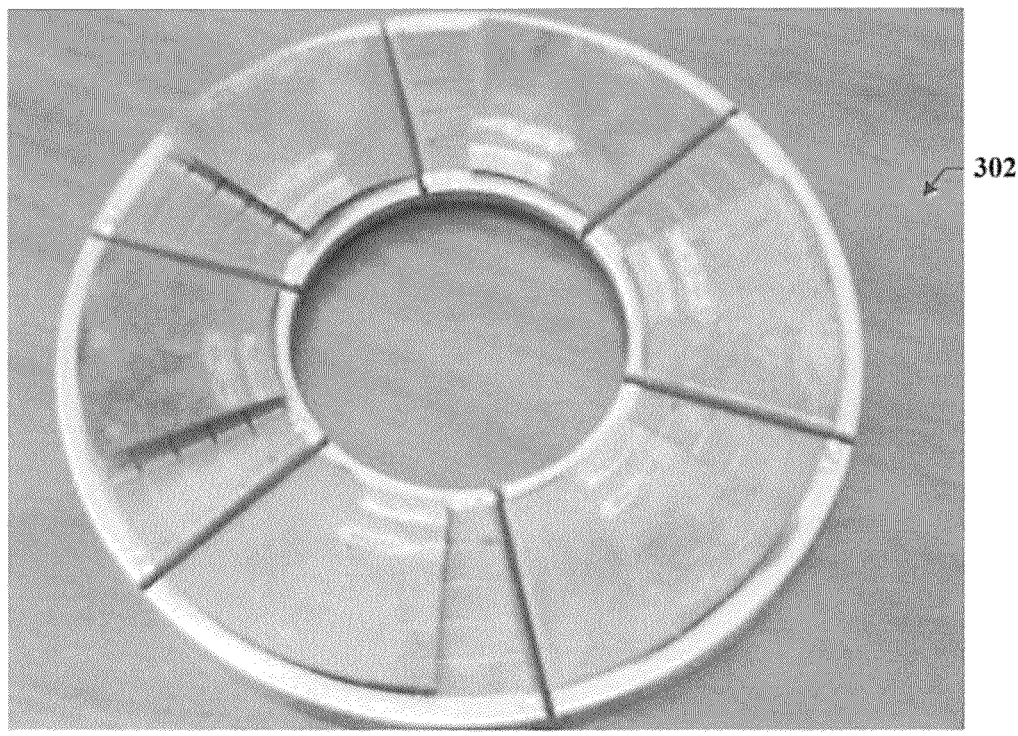
FIG. 3 is an illustration of conventional thrust foil bearings.
Figure 3:
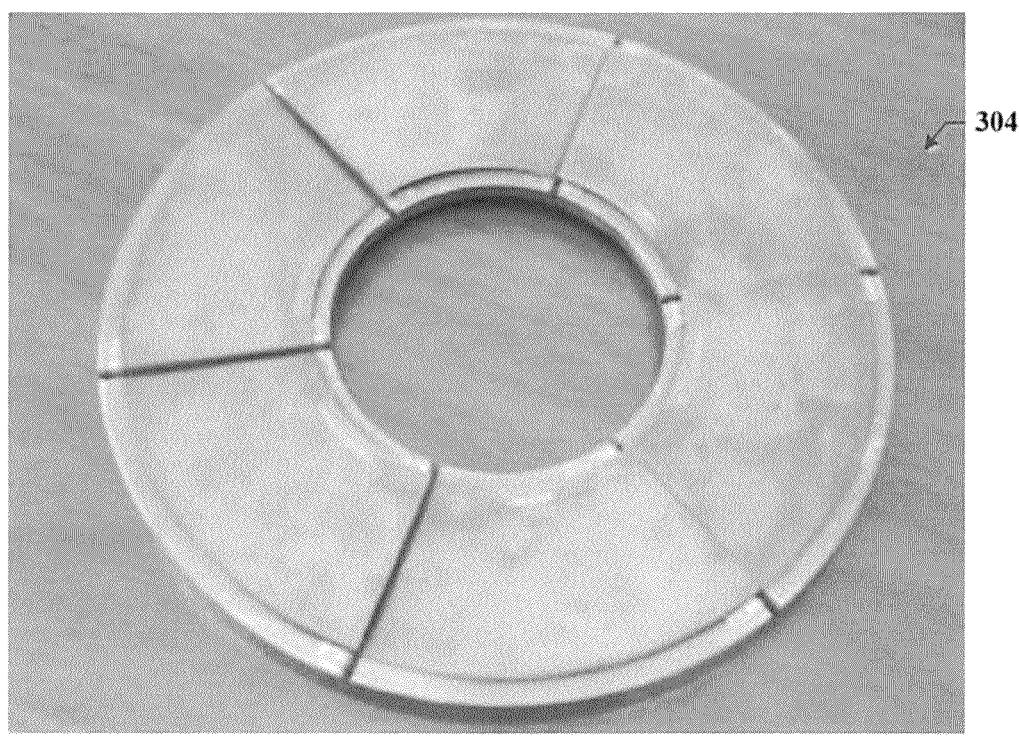

FIG. 3 is an illustration of conventional thrust foil bearings. Bearing 302 is an example of a conservative design having a top foil trailing edge to leading edge gap of 15 degrees. Bearing 304 utilizes a common approach to increase load capacity by increasing sector area and has a trailing edge to leading edge gap of zero.

Figure 4:
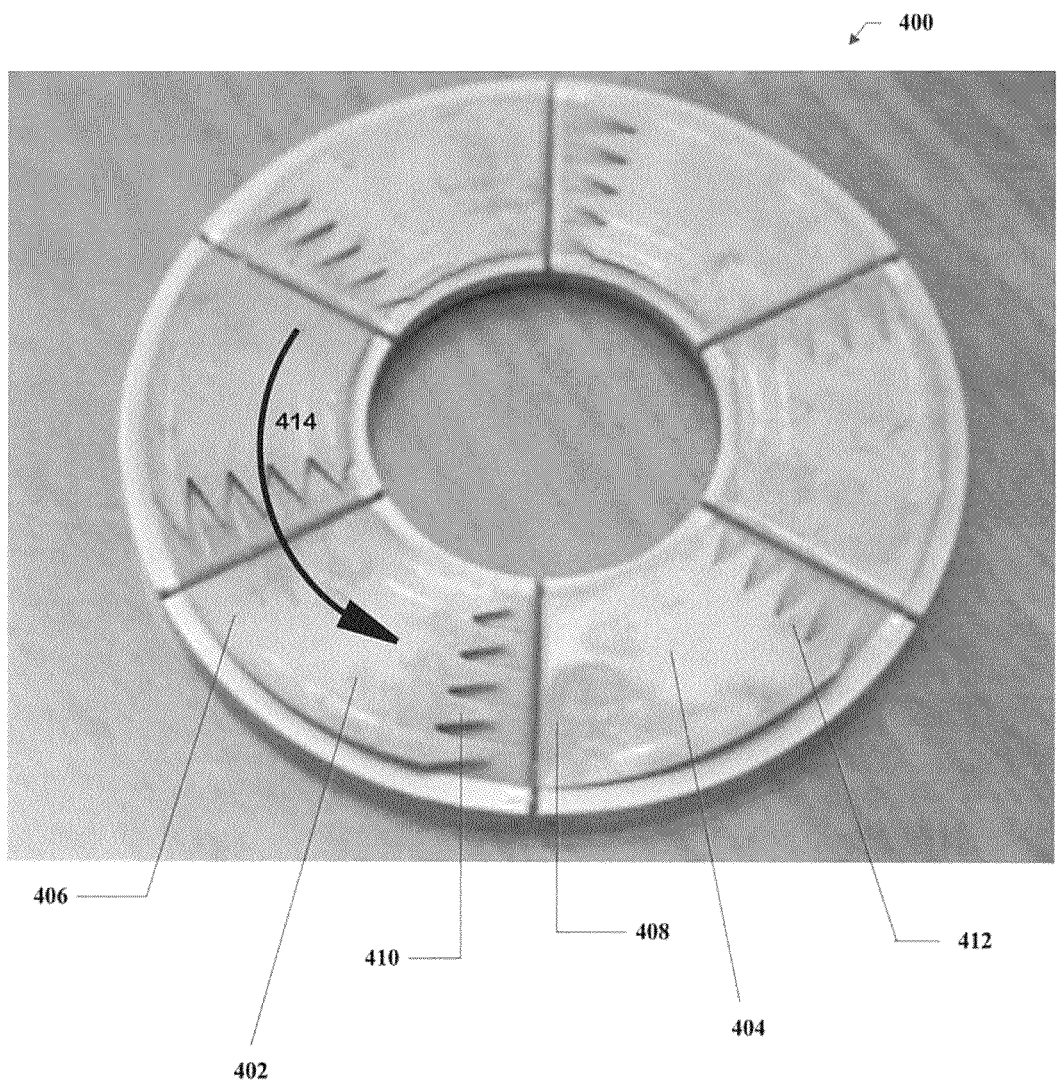
FIG. 4 is an illustration of a thrust foil bearing in accordance with an embodiment of the disclosure.

FIG. 4 is an illustration of a thrust foil bearing in accordance with an embodiment of the subject disclosure. Thrust bearing 400 includes a plurality of top foils 402, 404 having leading edges 406, 408 and trailing edges 410, 412. The trailing edges 410, 412 of the top foils 402, 404 have a shaped profile capable of disrupting the flow 414 of hydrodynamic fluid from one sector (e.g. top foil 402) to the subsequent sector (e.g. top foil 404). The profiles of the trailing edges 410, 412 may comprise rectangular, square, saw-tooth, crescent, chevron, trapezoidal, semicircular, sinusoidal and/or most any other shapes, or combination of shapes, capable of disrupting the flow of fluid from one sector to the subsequent sector and capable of promoting the mixing of surrounding ambient process fluid with the hydrodynamic film. Mixing of cooler ambient process fluid into the hydrodynamic film may dissipate heat energy from the foil bearing, increase the load carrying capacity and enhance performance of the foil bearing, and alleviate a need for forced cooling of the bearing.

In further embodiments, a surface of the compliant foils may be etched, or otherwise modified, to disrupt the flow of fluid from one sector to the next sector. A surface of the compliant foils may include protrusions or dimples capable of creating turbulence and disrupting the flow of fluid from one compliant foil to the succeeding compliant foil.

In yet further embodiments, a wiper or air dam may be formed on a surface of a compliant foil, for example at the leading or trailing edge. The wiper or air dam may encourage gas dynamic mixing and convection patterns to interrupt the flow of fluid from the trailing edge of one compliant foil to the next compliant foil.

In other embodiments, intersector seals may be disposed between compliant foils allowing cooler ambient process fluid to be included in the hydrodynamic film. The cooler ambient process fluid may dissipate heat energy from the foil bearing.

In accordance with an embodiment, an air curtain, or forced gas injection, may be utilized to disturb the flow of fluid from one sector to the subsequent sector. For example, air, or other fluid, may be forced through an outlet in the rotating member and directed to a leading or trailing edge of the compliant foil. The air curtain may be effective to promote the mixing of cooler ambient process fluid into the hydrodynamic film so as to minimize hot lubricant carryover.

Figure 5:
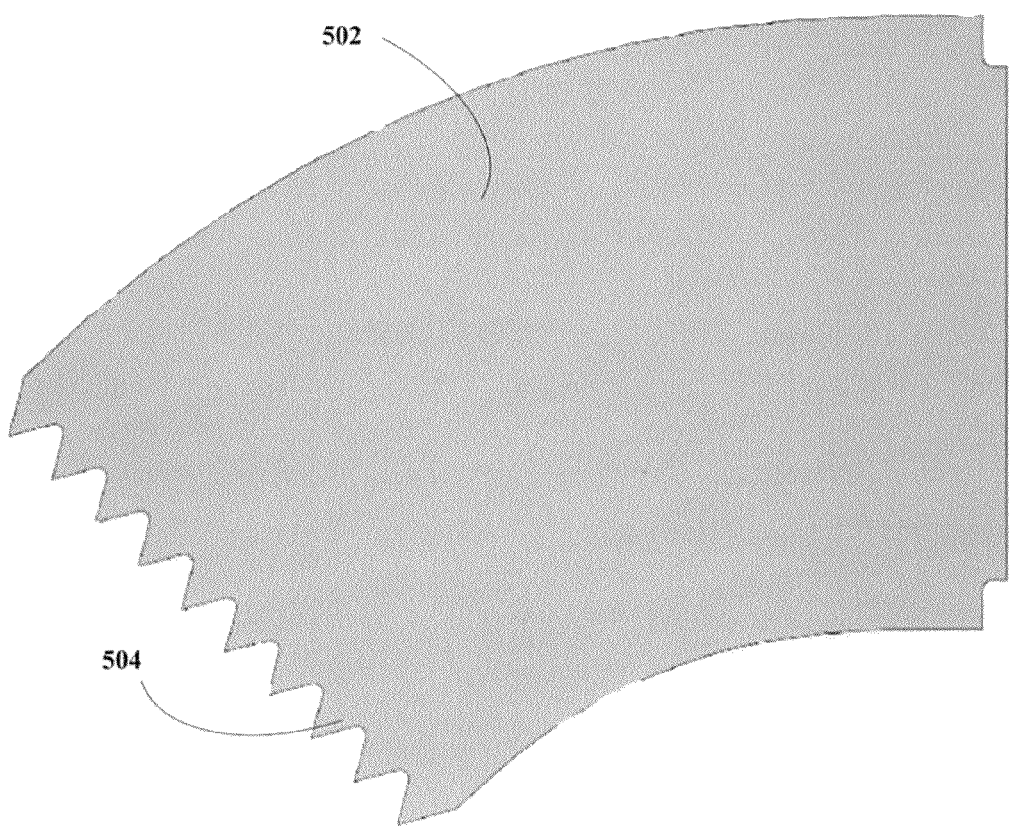
FIG. 5 is an example representation of a compliant top foil in accordance with an embodiment of the disclosure.

FIG. 5 is an illustrative top foil 502 of a thrust foil bearing in accordance with an embodiment of the disclosure. Top foil 502 includes trailing edge 504 having a profile comprising a plurality of generally triangular or chevron shapes.

Figure 6:
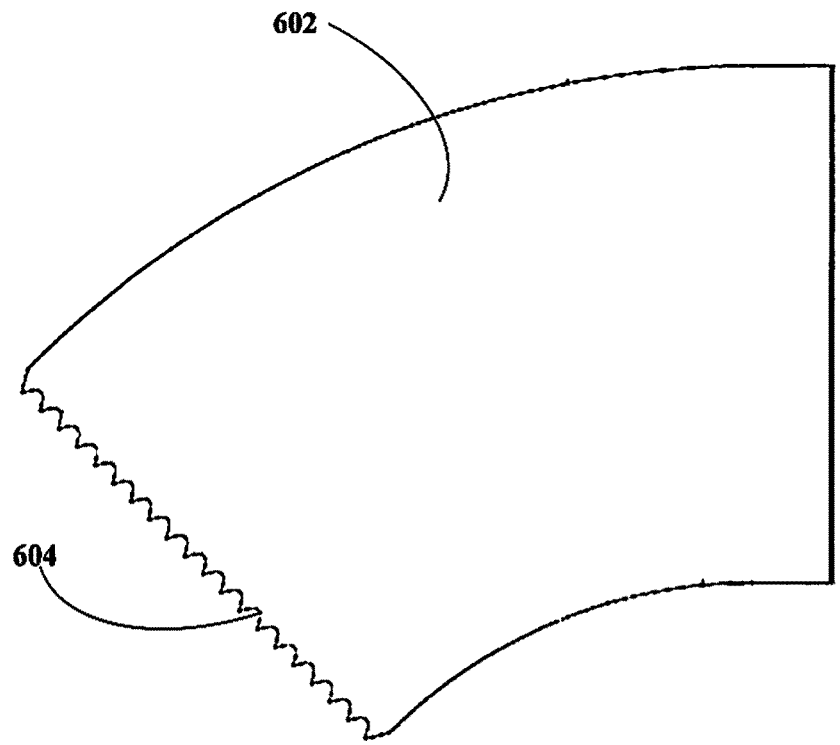
FIG. 6 is an example representation of a compliant top foil in accordance with an embodiment of the present disclosure.

FIG. 6 is an illustrative top foil 602 of a thrust foil bearing in accordance with an embodiment of the disclosure. Top foil 602 includes trailing edge 604 having a profile comprising a plurality of generally triangular or chevron shapes.

Testing

Testing has been conducted utilizing thrust foil bearings with top foil trailing edge features, as described herein, for example, trailing edge profile shaping. Results have shown trailing edge profile shaping can double the load capacity of a foil thrust bearing at low speeds of about 20,000 rpm. Further, there is potential for greater relative improvement in load capacity at higher speeds as such improvements in performance with respect to speed are typical of foil bearings.

Figure 7:
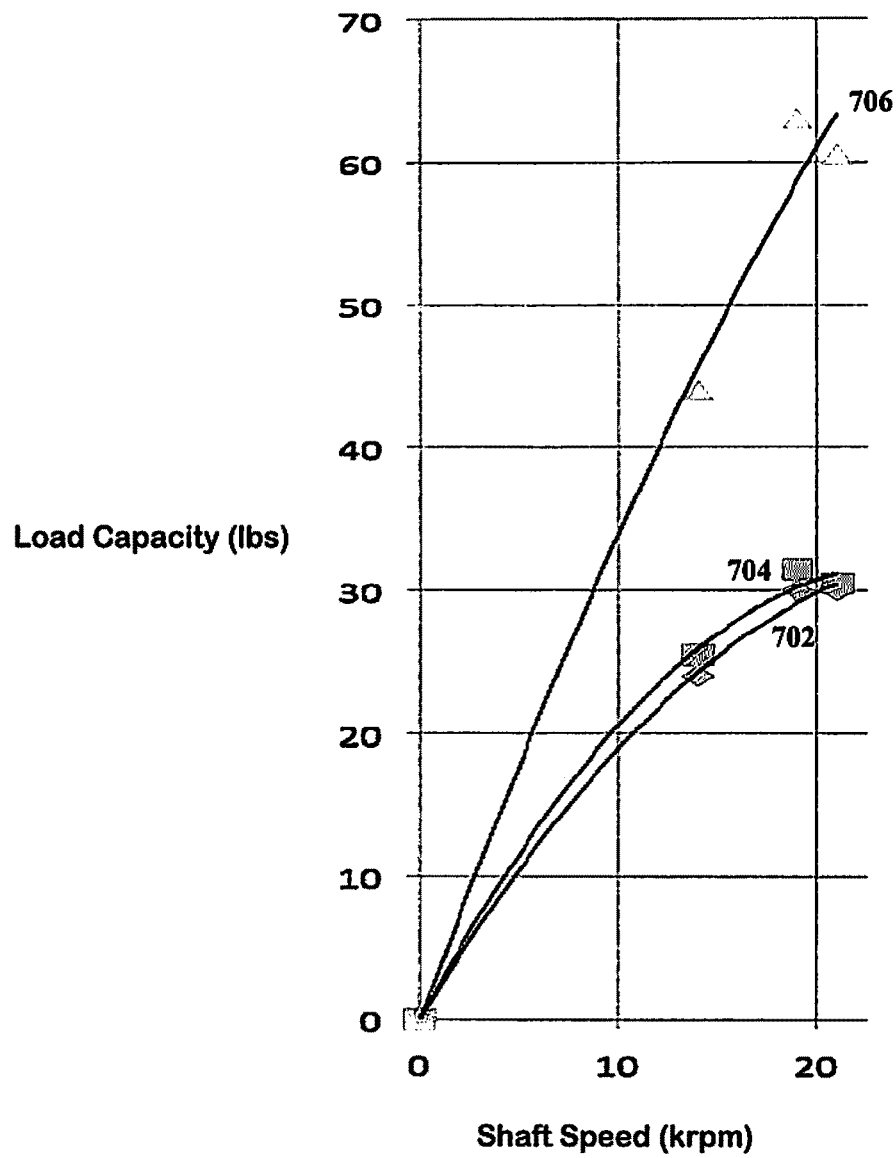
FIG. 7 is a graph illustrating test results achieved in accordance with embodiments of the disclosed system and method.

FIG. 7 is a graph illustrating test results achieved in accordance with embodiments of the disclosed system and method. Lines 702 and 704 represent test data collected for conventional thrust foil bearings, 302, 304 respectively, as shown in FIG. 3. Lines 702 and 704 indicate the load capacity of the bearings 302, 304 at low shaft speeds ranging from 0 rpm to about 20,000 rpm.

Line 706 represents test data collected for a thrust bearing in accordance with an embodiment of the disclosure including a top foil trailing edge profile as shown in FIG. 4. It can be seen that at approximately 20,000 rpm, the load capacity of the thrust bearing having the trailing edge profile feature is greater than sixty pounds, which is approximately double the load capacity of the traditional thrust foil bearings 702, 704. Therefore, the test data demonstrates that the trailing edge feature has a direct positive effect on the load capacity of the foil thrust bearing.

Figure 8:
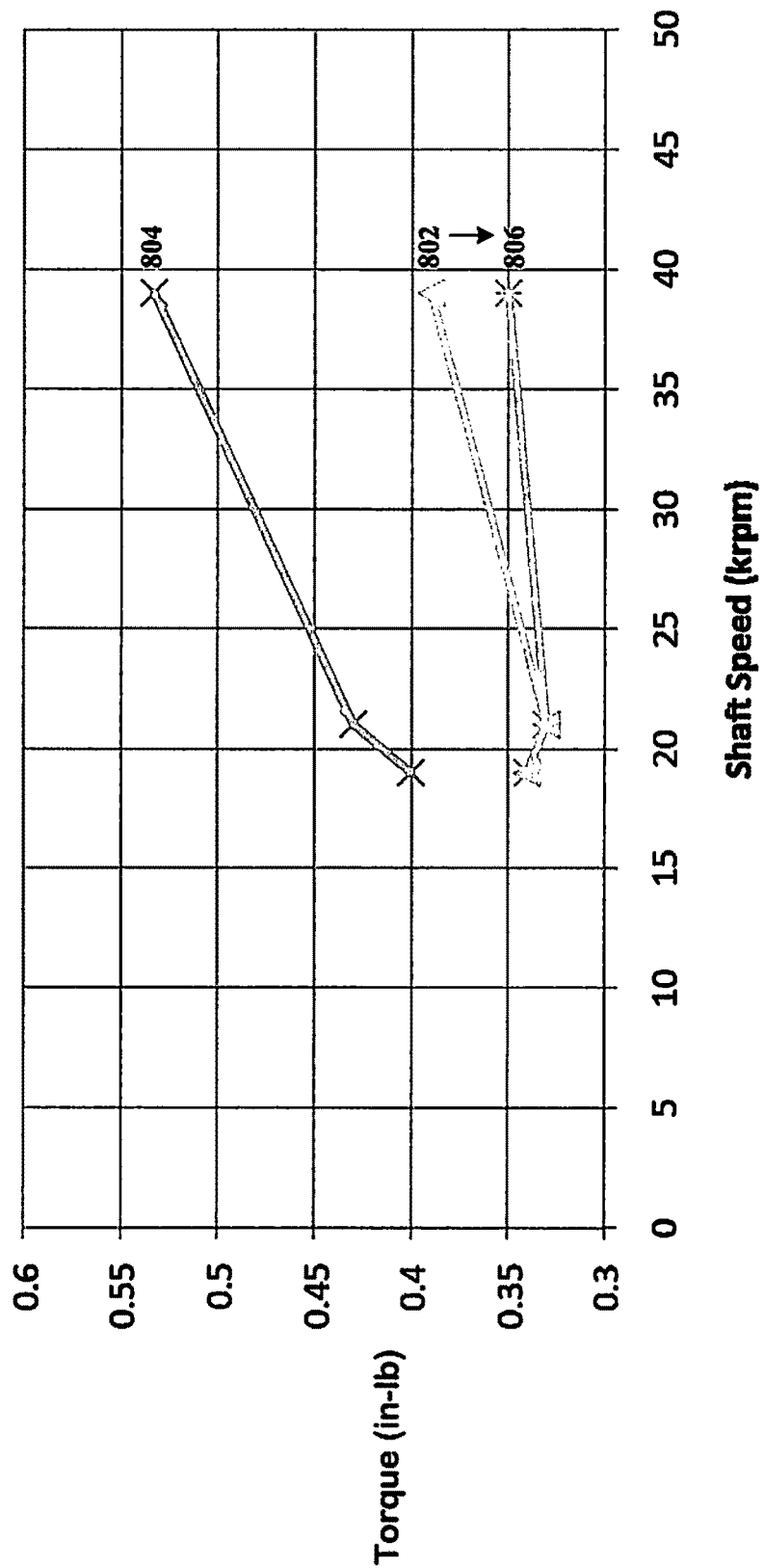
FIG. 8 is a graph illustrating test results achieved in accordance with embodiments of the disclosed system and method.

FIG. 8 is a graph illustrating test results achieved in accordance with embodiments of the disclosed system and method. Lines 802 and 804 represent test data collected for conventional thrust foil bearings, 302, 304 respectively, as shown in FIG. 3. The test data, as indicated by lines 802 and 804, demonstrate the frictional torque of the bearings at shaft speeds ranging from about 20,000 rpm to just under 40,000 rpm.

Line 806 represents test data collected for a thrust bearing in accordance with an embodiment of the present disclosure including a top foil trailing edge profile as shown in FIG. 4. It can be seen that the frictional torque of the thrust bearing having the trailing edge profile feature is lower than that of traditional thrust foil bearing 302, as shown by line 802, and significantly lower than traditional thrust bearing 304, as shown by line 804. Therefore, the test data establishes that the trailing edge feature serves to reduce the frictional torque of the foil thrust bearing.

Foil bearings in accordance with the disclosure may be useful for many commercial and industrial applications. These applications include, for example, most any high speed rotating machinery, aircraft turbine engines, auxiliary power units, air cycle machines, turbopumps, turbochargers, rocket turbopumps, power conversion units (generators), air conditioning systems, space station ammonia circulators, cryocoolers, pumps, blowers, compressors, electric motors and others.

While examples and embodiments have been discussed with regard to thrust foil bearing in particular, the disclosure is applicable to foil bearings of most any type including, for example, both thrust type and journal type foil bearings. The present disclosure is applicable to foil bearing utilizing gas, including air, oil or most any other fluid capable of serving as a hydrodynamic lubricant.

What has been described above includes examples of the disclosure. It is, of course, not possible to describe every conceivable combination of components or methodologies for purposes of describing the subject disclosure, but one of ordinary skill in the art may recognize that many further combinations and permutations of the disclosure are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or".

The invention claimed is:

1. A foil bearing system, comprising:
a compliant foil bearing mounted to a stationary member and operably disposed between the stationary member and a rotating member, wherein the compliant foil bearing supports the rotating member via a fluid film when the rotating member rotates;
a plurality of compliant foils mounted to the compliant foil bearing, the plurality of compliant foils facilitate passive thermal management of the fluid film without an external energy source, wherein the plurality of compliant foils are formed to disrupt a flow of heated lubricant from one compliant foil to the ensuing compliant foil.

2. The foil bearing system of claim 1, wherein the foil bearing comprises a journal type foil bearing capable of supporting a radial load.

3. The foil bearing system of claim 1, wherein the foil bearing comprises a thrust type foil bearing capable of supporting an axial load.

4. The foil bearing system of claim 1, wherein the foil bearing comprises an air foil bearing.

5. The foil bearing system of claim 1, wherein a trailing edge profile of the plurality of compliant foils comprises at least one of a semicircular, scalloped, triangular, trapezoidal, rectangular, square, sinusoidal, or chevron shape that provides passive thermal management of the fluid film.

6. The foil bearing system of claim 1, wherein a surface of the plurality of compliant foils is etched.

7. The foil bearing system of claim 1, wherein a surface of the plurality of compliant foils includes protuberances or depressions effective to provide passive thermal management of the fluid film.

8. The foil bearing system of claim 1, wherein a surface of the plurality of compliant foils includes a wiper capable of providing passive thermal management of the fluid.

9. The foil bearing system of claim 1, further including an air curtain capable of disrupting the flow of the fluid film across the compliant foils.

10. A method of passive cooling of a foil bearing system, comprising:
providing a compliant foil bearing mounted to a stationary member and operably disposed between the stationary member and a rotating member;
providing a plurality of compliant foils mounted to the compliant foil bearing, wherein the compliant foil bearing supports the rotating member via a fluid film when the rotating member rotates; and
disrupting a flow of the fluid film, without an external energy source, across the plurality of compliant foils to facilitate passive thermal management of the fluid film.

11. The method of passive cooling of the foil bearing system of claim 10, further including supporting a radial load with a journal type compliant foil bearing.

12. The method of passive cooling of the foil bearing system of claim 10, further including supporting an axial load with a thrust type compliant foil bearing.

13. The method of passive cooling of the foil bearing system of claim 10, wherein providing the compliant foil bearing comprises providing an air foil bearing.

14. The method of passive cooling of the foil bearing system of claim 10, wherein disrupting the flow of the fluid film across the plurality of compliant foils includes forming the plurality of compliant foils.

15. The method of passive cooling of the foil bearing system of claim 14, wherein forming the plurality of compliant foils comprises:
forming a trailing edge profile of the plurality of compliant foils, wherein the trailing edge profile includes at least one of a semicircular, scalloped, triangular, trapezoidal, rectangular, square, sinusoidal, or chevron shape effective to provide passive thermal management of the fluid film.

16. The method of passive cooling of the foil bearing system of claim 14, wherein forming the plurality of compliant foils comprises etching a surface of the plurality of compliant foils.

17. The method of passive cooling of the foil bearing system of claim 14, wherein forming the plurality of compliant foils includes positioning a wiper on a surface of the plurality of compliant foils.

18. The method of passive cooling of the foil bearing system of claim 14, wherein forming the plurality of compliant foils comprises forming protrusions or depressions effective to provide passive thermal management of the fluid film on a surface of the plurality of compliant foils.

19. The method of passive cooling of the foil bearing system of claim 14, including inducing an air curtain capable of disrupting the flow of the fluid film across the compliant foils.

* * * * *